US008060112B2

(12) United States Patent
Frank et al.

(10) Patent No.: US 8,060,112 B2
(45) Date of Patent: *Nov. 15, 2011

(54) MOBILE DEVICE AND GEOGRAPHIC INFORMATION SYSTEM BACKGROUND AND SUMMARY OF THE RELATED ART

(75) Inventors: Christopher E. Frank, Orono, ME (US); Michael H. Grillo, Penobscot, ME (US)

(73) Assignee: Intellient Spatial Technologies, Inc., Orono, ME (US)

( * ) Notice: Subject to any disclaimer, the term of this patent is extended or adjusted under 35 U.S.C. 154(b) by 79 days.

This patent is subject to a terminal disclaimer.

(21) Appl. No.: 12/398,016

(22) Filed: Mar. 4, 2009

(65) Prior Publication Data

US 2009/0227269 A1      Sep. 10, 2009

Related U.S. Application Data

(63) Continuation-in-part of application No. 11/811,516, filed on Jun. 11, 2007, which is a continuation of application No. 10/995,080, filed on Nov. 22, 2004, now Pat. No. 7,245,923.

(60) Provisional application No. 60/523,581, filed on Nov. 20, 2003, provisional application No. 61/034,675, filed on Mar. 7, 2008.

(51) Int. Cl.
*H04W 24/00* (2009.01)
(52) U.S. Cl. ............... 455/456.1; 455/456.2; 455/456.4; 455/456.5; 455/456.6
(58) Field of Classification Search ............... 455/456.1, 455/456.2, 456.4, 456.5, 456.6
See application file for complete search history.

(56) References Cited

U.S. PATENT DOCUMENTS

| 5,214,757 | A | 5/1993 | Mauney et al. |
| 5,470,233 | A | 11/1995 | Fruchterman et al. |
| 5,592,382 | A | 1/1997 | Colley |
| 5,628,050 | A | 5/1997 | McGraw et al. |
| 5,633,946 | A | 5/1997 | Lachinski et al. |

(Continued)

FOREIGN PATENT DOCUMENTS

WO      WO-2008/005795      1/2008

(Continued)

OTHER PUBLICATIONS

Egenhofer, M. J. et al., "A Mathematical Framework for the Definition of Topological Relationships", *Proceedings of the 4th International Symposium on Spatial Data Handling*, Zurich, Switzerland, Jul. 23-27, 1990, pp. 803-813.

(Continued)

*Primary Examiner* — Joseph Feild
*Assistant Examiner* — Huy D Nguyen
(74) *Attorney, Agent, or Firm* — Wilmer Cutler Pickering Hale and Dorr LLP (57) ABSTRACT

The present invention provides a system and mobile device for providing geographic information to a user. The system includes a mobile device that is wirelessly connected to a geographic database. The mobile device includes a plurality of sensors for determining a first location and a first direction. A controller is adapted to provide information requested based on local queries and distal queries. In addition, the controller can respond to thematic queries of each variety, wherein the database search is limited to objects, entities or features that fit within a selected theme. Finally, the controller is adapted to select and order query results based upon two- and three-dimensional query windows.

5 Claims, 9 Drawing Sheets

U.S. PATENT DOCUMENTS

| | | | |
|---|---|---|---|
| 5,745,113 | A | 4/1998 | Jordan et al. |
| 5,771,169 | A | 6/1998 | Wendte |
| 5,848,373 | A | 12/1998 | DeLorme et al. |
| 6,070,167 | A | 5/2000 | Qian et al. |
| 6,144,318 | A | 11/2000 | Hayashi et al. |
| 6,173,239 | B1 | 1/2001 | Ellenby |
| 6,222,482 | B1 | 4/2001 | Gueziec |
| 6,247,019 | B1 | 6/2001 | Davies |
| 6,262,741 | B1 | 7/2001 | Davies |
| 6,282,362 | B1 | 8/2001 | Murphy et al. |
| 6,334,087 | B1 | 12/2001 | Nakano et al. |
| 6,381,540 | B1 | 4/2002 | Beason et al. |
| 6,385,541 | B1 | 5/2002 | Blumberg et al. |
| 6,456,938 | B1 | 9/2002 | Barnard |
| 6,486,831 | B1 * | 11/2002 | Martorana et al. ............ 342/458 |
| 6,496,776 | B1 | 12/2002 | Blumberg et al. |
| 6,504,541 | B1 | 1/2003 | Liu et al. |
| 6,532,304 | B1 | 3/2003 | Liu et al. |
| 6,606,542 | B2 | 8/2003 | Hauwiller et al. |
| 6,708,109 | B1 | 3/2004 | Pradhan et al. |
| 6,732,120 | B1 | 5/2004 | Du |
| 6,795,768 | B2 | 9/2004 | Bragansa et al. |
| 6,799,115 | B1 | 9/2004 | Childs et al. |
| 6,847,883 | B1 | 1/2005 | Walmsley et al. |
| 6,879,838 | B2 | 4/2005 | Rankin et al. |
| 6,912,545 | B1 * | 6/2005 | Lundy et al. ........................ 1/1 |
| 6,930,715 | B1 | 8/2005 | Mower |
| 6,965,828 | B2 | 11/2005 | Pollard |
| 6,982,697 | B2 | 1/2006 | Wilson et al. |
| 6,983,202 | B2 | 1/2006 | Sanqunetti |
| 7,031,875 | B2 | 4/2006 | Ellenby et al. |
| 7,072,665 | B1 | 7/2006 | Blumberg et al. |
| 7,174,301 | B2 | 2/2007 | Florance et al. |
| 7,245,923 | B2 | 7/2007 | Frank et al. |
| 7,295,922 | B2 | 11/2007 | Simon Robert et al. |
| 7,418,341 | B2 | 8/2008 | Wuersch et al. |
| 2001/0044309 | A1 * | 11/2001 | Bar et al. ...................... 455/456 |
| 2002/0140745 | A1 | 10/2002 | Ellenby et al. |
| 2002/0155844 | A1 * | 10/2002 | Rankin et al. ................ 455/456 |
| 2002/0165662 | A1 | 11/2002 | Maruyama et al. |
| 2002/0171586 | A1 * | 11/2002 | Martorana et al. ............ 342/458 |
| 2003/0083063 | A1 | 5/2003 | Wang et al. |
| 2003/0149557 | A1 * | 8/2003 | Cox et al. ........................ 704/2 |
| 2004/0002303 | A1 | 1/2004 | Hirokawa |
| 2004/0021780 | A1 | 2/2004 | Kogan |
| 2004/0024522 | A1 | 2/2004 | Walker et al. |
| 2004/0078278 | A1 | 4/2004 | Dauga et al. |
| 2004/0087294 | A1 | 5/2004 | Wang |
| 2004/0145591 | A1 | 7/2004 | Luo et al. |
| 2005/0075119 | A1 * | 4/2005 | Sheha et al. ................ 455/456.6 |
| 2005/0108646 | A1 | 5/2005 | Willins et al. |
| 2005/0125145 | A1 | 6/2005 | Sakashita et al. |
| 2005/0130671 | A1 | 6/2005 | Frank et al. |
| 2005/0165548 | A1 | 7/2005 | Persson |
| 2005/0288858 | A1 | 12/2005 | Amer et al. |
| 2006/0041375 | A1 | 2/2006 | Witmer et al. |
| 2006/0103590 | A1 | 5/2006 | Divon |
| 2006/0208927 | A1 | 9/2006 | Poor et al. |
| 2006/0270460 | A1 | 11/2006 | Konkka et al. |
| 2006/0294062 | A1 | 12/2006 | Folchetti et al. |
| 2007/0049313 | A1 | 3/2007 | Grams et al. |
| 2007/0050129 | A1 | 3/2007 | Salmre |
| 2007/0055441 | A1 | 3/2007 | Retterath et al. |
| 2007/0150179 | A1 | 6/2007 | Pinkus et al. |
| 2007/0288196 | A1 | 12/2007 | Frank et al. |
| 2008/0049016 | A1 | 2/2008 | Shearer |
| 2008/0070684 | A1 | 3/2008 | Haigh-Hutchinson |
| 2008/0109758 | A1 | 5/2008 | Stambaugh |
| 2008/0114564 | A1 | 5/2008 | Ihara |
| 2008/0133488 | A1 | 6/2008 | Bandaru et al. |
| 2008/0162032 | A1 | 7/2008 | Wuersch et al. |
| 2008/0262723 | A1 | 10/2008 | Wuersch et al. |
| 2009/0227269 | A1 | 9/2009 | Frank et al. |
| 2010/0303293 | A1 | 12/2010 | Caduff |
| 2010/0303339 | A1 | 12/2010 | Caduff |
| 2010/0306200 | A1 | 12/2010 | Frank et al. |
| 2010/0306707 | A1 | 12/2010 | Caduff |

FOREIGN PATENT DOCUMENTS

| | | |
|---|---|---|
| WO | WO-2009/111578 | 9/2009 |
| WO | WO-2010/075455 | 7/2010 |
| WO | WO-2010/075456 | 7/2010 |
| WO | WO-2010/075466 | 7/2010 |
| WO | WO-2010/078455 | 7/2010 |

OTHER PUBLICATIONS

Egenhofer, M.J. et al., "Beyond Desktop GIS A Family of Portable Spatial Information Technologies", *In GIS PlaNET*, Lisbon, Portugal, 1998.

Egenhofer, M.J. et al., "Categorizing binary topological relations between regions, lines, and points in geographic databases", Tech. Rep. 90-12, National Center for Geographic Information and Analysis, University of California, Santa Barbara, CA, 1990.

International Search Report and Written Opinion, International Patent Application No. PCT/US09/36053, mailed Apr. 22, 2009 (6 pages).

International Search Report and Written Opinion of the Internatinal Searching Authority, the United States Patent and Trademark Office, for International Application No. PCT/US2009/069860, dated Mar. 2, 2010, 7 pages.

International Search Report and Written Opinion of the International Searching Authority, the European Patent Office, for International Application No. PCT/US2007/072358, dated Nov. 30, 2007, 8 pages.

International Search Report and Written Opinion of the International Searching Authority, the United States Patent and Trademark Office, for International Application No. PCT/US2009/069312, dated Mar. 4, 2010, 8 pages.

International Search Report and Written Opinion of the International Searching Authority, the United States Patent and Trademark Office, for International Application No. PCT/US2009/069313, dated Feb. 19, 2010, 8 pages.

International Search Report and Written Opinion of the International Searching Authority, the United States Patent and Trademark Office, for International Application No. PCT/US2009/069327, dated Mar. 4, 2010, 7 pages.

Wuershch, et al., "Refined Route Instructions Using Topological Stages of Closeness," presented at the Geological Information Science Conference in Munster, Germany on Sep. 20-23, 2006 (www.giscience.org), pp. 31-41, 12 pages.

* cited by examiner

FIG. 15

MOBILE DEVICE AND GEOGRAPHIC INFORMATION SYSTEM BACKGROUND AND SUMMARY OF THE RELATED ART

RELATED APPLICATIONS

The present application is a Continuation-in-Part of U.S. patent application Ser. No. 11,811,516 filed Jun. 11, 2007, which is a continuation of U.S. patent application Ser. No. 10/995,080, filed Nov. 22, 2004, now U.S. Pat. No. 7,245,923 that claims the benefit under 35 USC 119(e) to U.S. Provisional Application No. 60/523,581 filed Nov. 20, 2003; and also claims the benefit under 35 USC 119(e) to U.S. Provisional Application Ser. No. 61/034,675, filed on Mar. 7, 2008, the entire contents of which are incorporated by reference.

FIELD OF THE INVENTION

The present invention relates generally to systems and devices for determining geographic information, and specifically to distributed systems and devices for interpreting spatial and geographic data and presenting said data to a user.

HISTORY OF THE RELATED ART

Maps still provide the main means for understanding spatial environments, as well as for performing tasks such as wayfinding, trip-planning, and location-tracking. Static traditional maps have several disadvantages. First, maps necessarily have a fixed orientation. That is, the map always faces in one direction (typically north). The map users, however, may be facing any direction at any given moment. Hence, in order to understand the map users need to perform some kind of rotation, either of themselves or of the map to align their frame of reference with the map's frame of reference. This process puts an immense cognitive load on the users, because it is not always intuitive and may present considerable difficulties, especially in cases of complex, uniform or unfamiliar spatial environments.

Maps are also hindered by the fact that they have a fixed scale that cannot be changed to a different granularity level. This limitation is one of the most restrictive aspects of paper maps. The scale determines the level of zooming into a spatial environment, as well as the level of detail and the type of information that is displayed on a map. Users, however, need to constantly change between different scales, depending on whether they want a detailed view of their immediate surrounding environment or a more extensive and abstract view in order to plan a trip or find a destination. Current solutions to the problem include tourist guides that comprise maps of a specific area at many different scales. Tourist guides, however, are bulky books, difficult to carry around, and search time is considerable as they typically consist of hundreds of pages.

Maps also fail to accommodate rapid changes in our natural and urban environments. On a map, all spatial environments and the objects that they encompass, whether artificial or natural, are displayed statically although they are actually dynamic and change over time. Artificial spatial objects, such as buildings, may get created, destroyed, or extended, while others, such as land parcels, may merge, shrink, or change character (e.g., when a rural area is developed). The same holds true for natural features, for instance, a river may expand or shrink because of a flood. The static 2-dimensional map is restricted to representing a snapshot in time and the information on it may soon become obsolete, or worse, misleading.

Maps are also limited in their ability to display thematic information. There are many different types of maps such as morphological, political, technical, tourist-oriented, and contour maps. The thematic content of a static map must be defined at the time of printing and is usually restricted to one area of interest. Even then, the information displayed is minimal. For example, a tourist map will indicate that a building is a church or a restaurant, but it is highly unlikely that more information will be available, such as the construction date of the church or the menu of the restaurant and the type of cuisine it offers.

Attempts at electronic maps or geographic information systems have also proven unworkable for practical reasons. One deficiency found in current geographic information systems is that the systems are not egocentric, i.e. they cannot discriminate between data based upon the user's point of view and intentions. The state of the art lacks an integrated geographic information system that can provide information to a user in a manner that is easily accessible, intuitively understood, and based upon the user's perspective.

SUMMARY OF THE INVENTION

Accordingly, the present invention provides a system and mobile device for providing geographic information to a user. The system includes a mobile device that is wirelessly connected to a geographic database. The mobile device, as a single defined device or a combination of connected devices, includes a plurality of sensors for determining a first location and a first direction, and is thus egocentric and aligned with the user's position and perspective. A controller is part of the mobile device, and it is adapted to provide information requested based on two distinct types of queries: local queries and distal queries. A local query provides information regarding the first location; and a distal query incorporates information regarding the first location and the first direction to determine the characteristics of an object, geographic feature or landmark that is not in the purview of the first location.

In addition, the controller can respond to thematic queries of each variety, wherein the database search is limited to objects, entities or features that fit within a selected theme. The thematic query protocol can be used in either the local or distal queries to comb the set of relevant data and find only those objects, geographic features, or landmarks that fit within a predetermined theme. Accordingly, the egocentricity of the present invention is buttressed by the fact that the user can request specific information about a building in his vicinity using a thematic local query. Moreover, the user can request specific information about a river or lake that is located at a distance using a thematic distal query.

Finally, the controller is adapted to select and order query results based upon the novel process of creating two and three dimensional query windows and weighting query results based upon predetermined relationships to the query windows. This feature allows the controller to select probable query results based upon the mathematical relevance of any particular object, geographic feature or landmark based upon the type of query formulated and any selected theme. This feature of the present invention is particularly useful in distinguishing between geographic features that may overlap or be organized in a hierarchical manner. For example, in a local query, the present invention can distinguish between a town, a state, a region and a country based upon the size of the query window and the relative sizes of each hierarchically organized locale.

Further features and advantages of the present invention will become more apparent to those skilled in the art by referring to the drawings and the detailed description of the present invention that follows.

DETAILED DESCRIPTION OF THE PRESENT INVENTION

1. System and Mobile Device of the Present Invention

Figure 1:
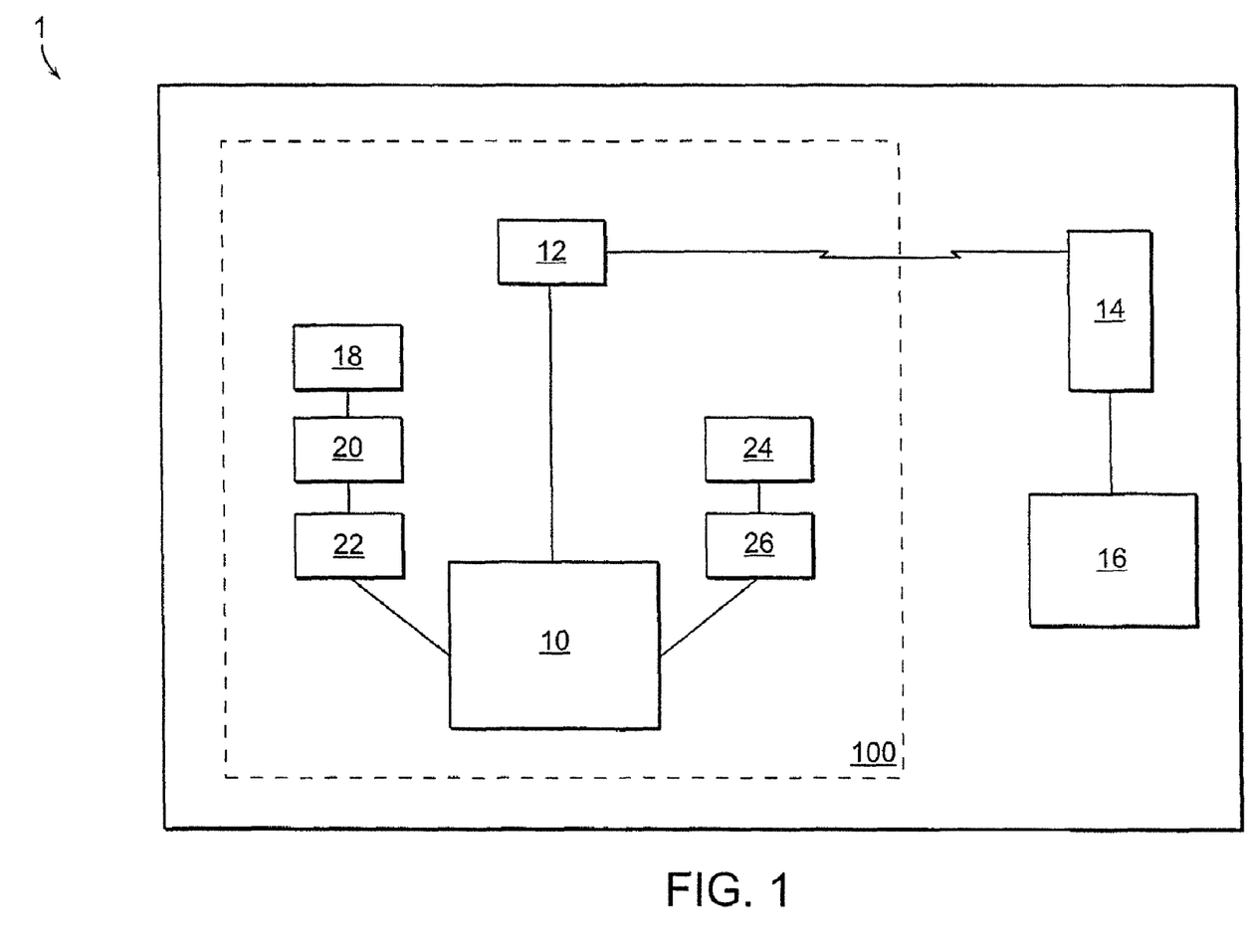
FIG. 1 is a schematic diagram of a system for providing geographic information in accordance with the present invention.

Referring now to the Figures, the present invention is described below in detail. Turning specifically to FIG. 1, a system 1 for providing geographic information is shown in schematic format. As described more fully below, the system 1 of the present invention is an improvement over existing geographic information systems. In particular, the system 1 provides a user with a more intuitive and egocentric model of his or her physical surroundings.

The system 1 generally includes a mobile device 100, an embodiment of which is shown in FIG. 1 and designated by the phantom line that encompasses its elements. Mobile device 100 connects to wireless router 14 and a database 16. The mobile device 100 may be any portable electronic or computing device, such as a personal digital assistant, wireless telephone, laptop personal computer, tablet personal computer or any other electronic apparatus that is capable of carrying out digital instructions based on data that is supplied from a remote location. The wireless router 14 is connectable to the mobile device 100 through a wireless network connection. The wireless router 14 is further connected to a database 16 that organizes and stores geographic, historical, and other data about any number of landmarks, buildings, and locations.

The mobile device 100 shown in FIG. 1 includes a number of subsystems and sensors that are adapted for determining a wide array of geospatial information. The mobile device 100 includes an antenna 12 that is capable of communicating wirelessly with the wireless transceiver 14, as indicated above. The mobile device 100 also includes a controller 10 that is coupled to the antenna 12. The controller 10 is adapted to receive signals from the antenna 12, transmit signals through the antenna 12, as well as receive and process data from a plurality of sensors as discussed below.

The mobile device 100 includes a position sensor 18, such as a Global Positioning System (GPS) that is capable of determining a position by such variables as latitude, longitude and altitude. The position determined by the position sensor 18 is hereinafter referred to as the origin. A pitch sensor 20 and a yaw sensor 22 are also included in the mobile device 100 for determining a set of angles that correspond to a first direction, which can be interpreted as an arrow or vector projected from the origin.

If mobile device 100 is configured as a combination of separate devices, it may include a headset and a connected GPS enabled device, such as a cell phone, PDA or other electronic apparatus as previously indicated. Preferably, the headset will include a digital compass.

Preferably, the headset will function to provide the information associated with pitch sensor 20, yaw sensor 22, and audio output 26. The headset may also be configured to control an audio input from a system user for making requests. The audio input may be through an integrated microphone in the headset. The GPS enabled device, such as a GPS enabled cell phone, may include antenna 12, controller 10, display 24, and GPS sensor 18. Alternatively, the cell phone may be used for providing an audio input to the system for making requests through an integrated microphone.

The mobile device 100 also includes a display 24 and an audio output 26 that relay any information retrieved from the database 16 to the user. The audio output 26 is preferably connected to a set of headphones, and in a most preferred embodiment, the audio signals may be sent wirelessly to the user's headphones through the antenna 12. In alternate embodiments, the display 24 and audio output 26 may be disposed in a separate electronic device, such as a portable digital assistant, which is remotely located from the mobile device 100. In such an embodiment, the mobile device 100 would consist primarily of the sensory components and the communications components, as discussed above.

Figure 2:
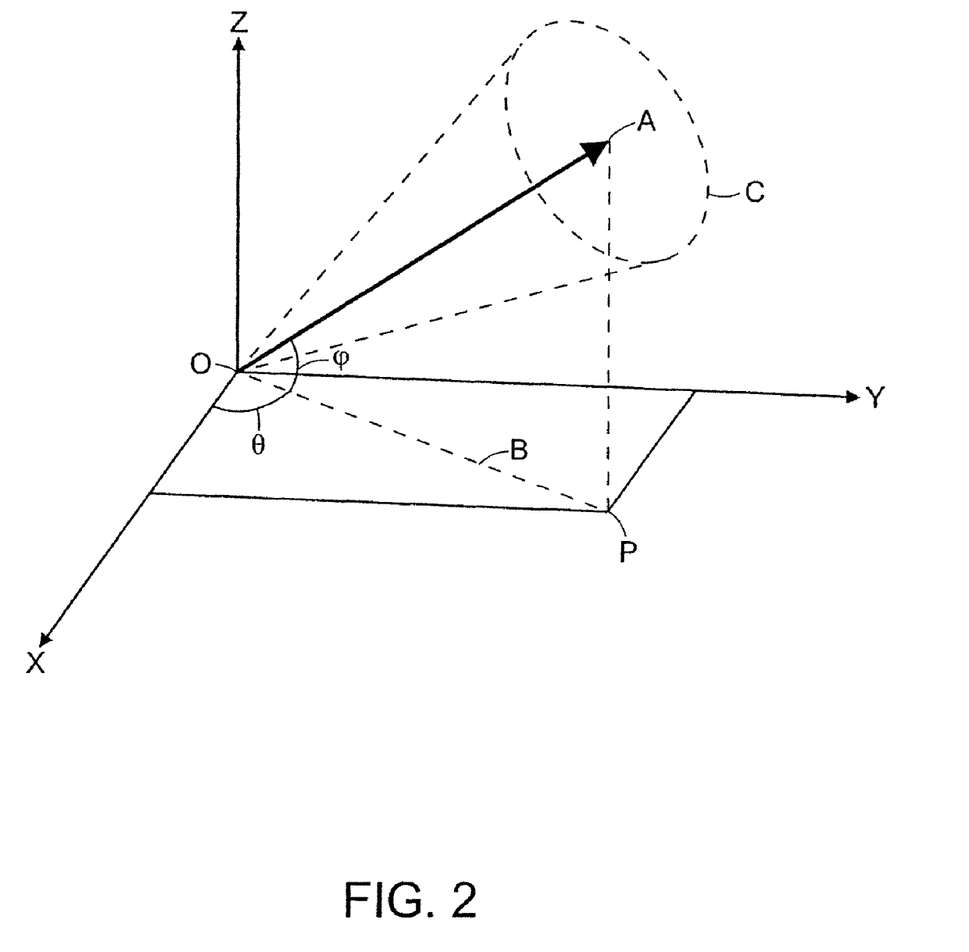
FIG. 2 is a schematic illustration of the measurement functions of a mobile device for providing geographic information in accordance with the present invention.

In FIG. 2 a schematic illustration of the measurement functions of the mobile device 100 is shown. As noted before, the position sensor 18 is preferably configured to determine a first position depicted as the origin, O. The origin is shown here as being at the center of a set of Cartesian axes, X, Y, and Z that correspond to a latitude, longitude and elevation, respectively. The mobile device 100 may be pointed in a first direction designated by the arrow A, which can be measured by the pitch sensor 20 and yaw sensor 22. The pitch sensor 20 is configured to measure an angle $\phi$ that is defined as the angle between the line A and its projection on the X-Y plane, designated by the line B. The yaw sensor 22 is configured to measure an angle $\theta$ that is defined as the angle between the X-axis and the line B.

The mobile device 100 is thus adapted to determine both a position O and a first direction A using three sensors coupled to the controller 10. As is understood by those skilled in the art, the measurement tolerance of the respective sensors is not negligible, and thus the first direction A can be more appropriately represented by a cone, C, which accounts for any deviation or error in the measurement apparatus. For purposes of the following detailed description therefore, the first direction will be better understood as a cone C which incorporates any inherent measurement error of the various sensors, as shown in FIG. 2.

When the headset and GPS enabled device are combined to form mobile device 100, the headset as stated will include a digital compass. This digital compass includes an integrated tilt compensated digital compass preferably with a tri-access accelerometer and tri-access magnetic sensor to provide support for sensing compass headings in six degrees of freedom. By six degrees of freedom, it refers to the motion of a body in three dimensional space namely the ability to move forward/backward, up/down, and left/right translated in three perpendicular axes combined with rotation about the three perpendicular axes, namely roll, yaw and pitch. The headset including the digital compass and the connected GPS device, such as a cell phone may be wirelessly or wire connected. Preferably, if the headset and cell phone are wirelessly connected, it is through a Bluetooth or equivalent connection. It is understood that any number of methods of connecting the headset and cell phone may be used and still be within the scope of the present invention, and a Bluetooth connection just represents one such connection type.

When the combination of the headset and GPS enabled device, such as a GPS enabled cell phone, are used as the mobile device, the GPS enabled cell phone will provide the location of the user and the digital compass enabled headset will provide the pointing direction, and elevation or depression for purposes of identifying objects and features of interest.

2. Operation of the Controller of the Present Invention

The controller 10 is adapted to receive various sensor inputs from position sensor 18, pitch sensor 19 and yaw sensor 20, as well as communicate with the database 16 for receiving information regarding information of interest. The information of interest may be generally construed as geographic information, such as information about "here" or information about "there." The information of interest may also include historical facts and data concerning a particular structure, building, landmark, or the like which may be included in the database 16.

The controller 10 operates on a query-based paradigm, in which a user submits questions passively (by being located in a location) or actively (by pointing the mobile device 100 at a distal location). The overarching query structure of the present invention is egocentric, meaning that the controller 10 is adapted to process and present information in a manner that is accessible and relevant to a user. An egocentric abstract data type (ADT) may be represented in the following standard query language (SQL) block:

```
>     Create        Table traveler (
>     name          varchar(30),
>     address       varchar(45),
>     DoB           datetime,
>     ego           egocentric);
```

Each time the mobile device 100 is used, the controller 10 must be configured to process any inputs from the sensors in the proper fashion. That is, the controller 10 must be able to identify the user, verify the accuracy of the position measurements, and receive the position measurements from the various sensors. The compilation of these tasks results in an egocentric spatial data model. A block diagram illustrating a user profile for the mobile device 100 is shown in FIG. 3.

Figure 3:
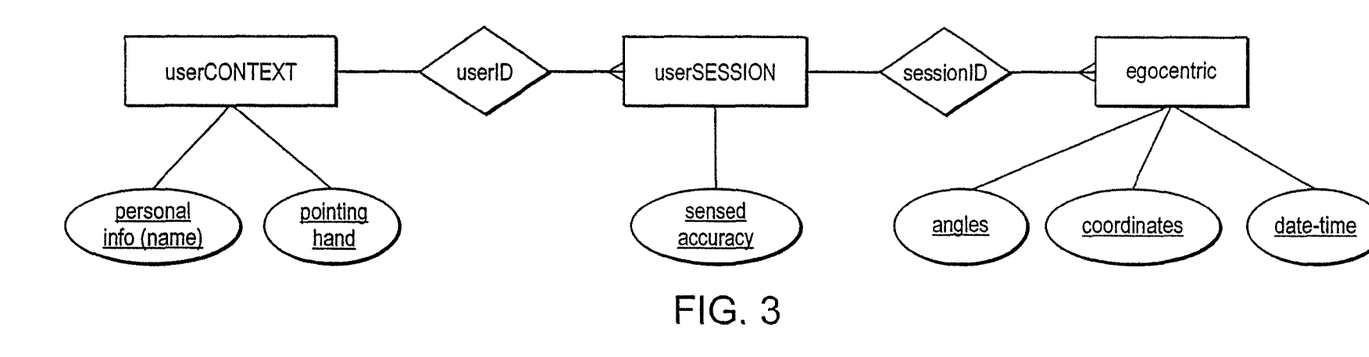
FIG. 3 is a block diagram illustrating a user profile for a system for providing geographic information.

FIG. 3 shows three relational tables necessary for the egocentric spatial data model. First, an egocentric table represents the user's time-of-query position and orientation. Second, a userSESSION table consists of data regarding the accuracy of the sensors and the data for any querying session. Thirdly, a userCONTEXT table consists of data about the user's querying traits such as arm used to point at a particular object. For example, there is a measurable difference between what a user thinks the mobile device 100 is pointed at and the actual direction of the mobile device 100 as determined by the sensors. By knowing the user's pointing hand, the egocentric spatial data model can account for this discrepancy and provide a more reliable interpretation of the first direction. Some of the aforementioned data tables may be preinstalled in the mobile device 100, while the sensors supply most of the data automatically and implicitly.

The egocentric table models the user's current geographic position, orientation, and time, as noted above. An example of the egocentric table is shown in the following SQL block:

```
>     CREATE TABLE egocentric (
>     24, -- ego_id NUMBER PRIMARY KEY,
>     1, -- session_id NUMBER FOREIGN KEY,
>     45.5432156, -- x-coordinate
>     68.5443433, -- y-coordinate
>     13.1674934, -- z-coordinate
>     89.528, -- yaw angle in degrees
>     21.367, -- pitch angle in degrees
>     04-27-2003 10:39:52.32, -- date-time
>     );
```

The userSESSION data table is used to provide context for a user's query session. It is also necessary to add validity to the sensed data within the egocentric table. The userSESSION table represents the stored position, orientation, and temporal accuracy information about the query session. The userSESSION table is updated when some querying aspect changes, for example, when the user decides to use information about his or her elevation from one of many different sources. In some cases it is probably better to utilize the user's elevation value from the digital terrain model, or objects on the model like a building. In other cases it might be best to use the elevation sensed by the position sensor 18, for example if the user is not on the ground. One user can have many query sessions, because it is possible for him or her to use different query configurations. The next SQL block depicts the kind of data in the userSESSION table:

```
>     CREATE TABLE userSESSION(
>     1, -- session_id NUMBER PRIMARY KEY,
>     2, -- user_id NUMBER FOREIGN KEY,
>     30, -- x y positional accuracy in feet
>     40, -- z positional accuracy in feet
>     5, -- orientation accuracy in angle degrees
>     5, -- temporal accuracy in seconds
>     1, -- use sensed z Boolean
>     );
```

The third table necessary for the egocentric spatial data model is the userCONTEXT table, which represents the stored data regarding the user's query context, for example, the hand used for query-by-pointing. Knowing which hand the user points with is necessary to compensate for the discrepancy between the perceived and actual direction in which the mobile device 100 is pointed. Whereas the userSESSION table represents contextual data about the sensed spatial attributes in the egocentric table, the userCONTEXT table provides personal contextual information about the user. It should be noted that the userCONTEXT table could be linked to many userSESSION tables and each userSESSION table could be linked to many egocentric tables. Shown below is an example of the SQL block to create the userCONTEXT table:

```
>    CREATE TABLE userCONTEXT (
>    user_id NUMBER PRIMARY KEY,
>    name VARCHAR2 (32),
>    pointing_hand VARCHAR2 (10)
>    );
```

To access and manipulate the egocentric spatial data model described above, the controller 10 is adapted to operate on a framework of query operations, namely those that provide information regarding to the first location and the first direction. The present invention uses two tiers of query operations: a thematic query operation and a generic query operation. Each of the two tiers can be applied to both local and distal classes of queries. That is, for any query about a local spatial object or location ("here"), the present invention can respond to both thematic queries and generic queries. Likewise, for any query about a distal spatial object or location ("there"), the present invention can respond to both thematic and generic queries.

The thematic query is defined as a generic query operation that contains an additional restrictive element, thus narrowing the scope of the query to selected themes. Examples of themes include buildings, rivers, lakes, towns, mountains and any other object, destination or location for which information can be stored on the database 16.

2.1 Generic Queries

Figure 4:
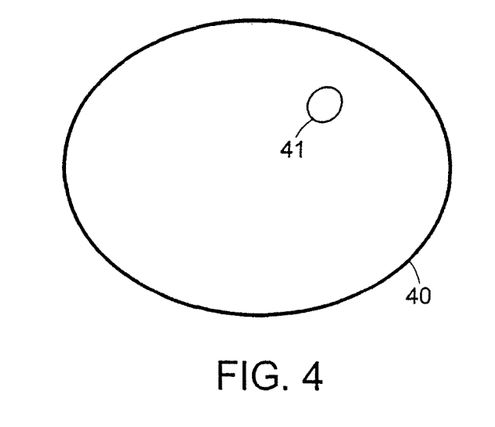
FIG. 4 is a schematic diagram of a local query in accordance with the present invention.

The mobile device 100 is adapted for determining both a first location ("here") and a first direction ("there"). The question, "Where am I?" is what the controller 10 of the present invention IS designed to process in determining the first location. The controller 10 is adapted to receive information from the position sensor 18 and determine a region in which a user is located. As shown in FIG. 4, the region 40 is the oval polygon and the O denotes the first position or origin as sensed by the position sensor 18. The generic local query is represented in the following SQL block:

```
>    SELECT    *.name
>    FROM      *
>    WHERE     *.geo contains traveler.here;.
```

Figure 5:
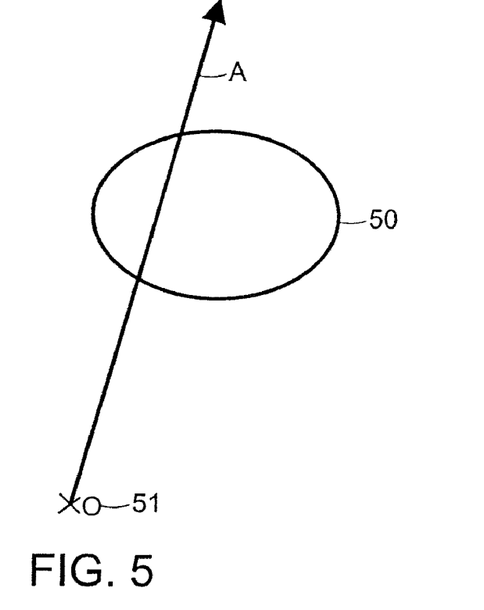
FIG. 5 is a schematic diagram of a distal query in accordance with the present invention.

On the other hand, the controller 10 is also adapted to respond to the query "What is that?" in determining the first direction. As shown in FIG. 5, a query of this nature can be answered by determining with which region intersects the ray that originates at the first location 51 and points in the sensed direction designated by arrow A. In FIG. 5, a region of interest 50 is represented by the oval polygon, the origin is designated O, and the direction of the arrow A starting from the origin is determined by the receipt of inputs from the pitch sensor 20 and the yaw sensor 22. The generic distal query is represented by the following SQL block:

```
>    SELECT    *.name
>    FROM      *
>    WHERE     *.geo contains traveler.there;.
```

2.2 Thematic Queries

Figure 6:
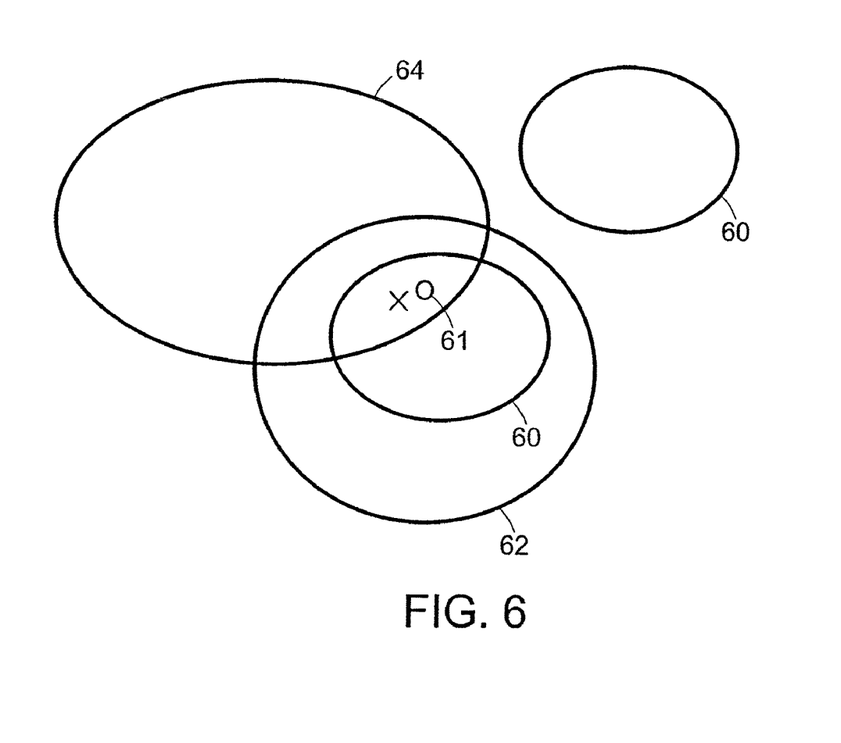
FIG. 6 is a schematic diagram of a thematic local query in accordance with the present invention.

Likewise, the controller 10 of the present invention is adapted to respond to thematic queries that may restrict the data set to only include information about objects or locations of a selected class. FIG. 6 is a schematic representation of a local thematic query. The origin in FIG. 6 is within a number of overlapping oval polygons 60, 62, 64. A thematic query might ask, "In what region of type 60 am I located?" As noted before, the controller 10 is adapted to receive information from the position sensor 18 and determine a region in which a user is located. As shown in FIG. 6, there are two regions 60, and the origin O is only disposed within one of them. Although the origin O is located within many regions 60, 62, 64, it is contained within only one of the polygons designated 60. Although there are two polygons designated 60, only one contains the origin and thus there is a unique answer to the thematic local query. The following SQL block represents a thematic local query, wherein the theme is a "town."

```
>    SELECT    town.name
>    FROM      town
>    WHERE     town.geo overlaps traveler.here;.
```

Figure 7:
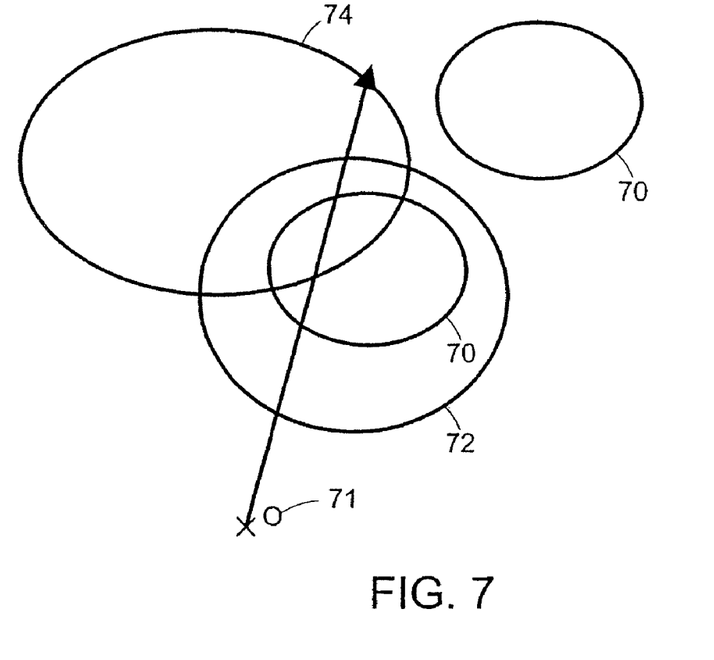
FIG. 7 is a schematic diagram of a thematic distal query in accordance with the present invention.

Similarly, the controller 10 of the present invention is adapted to process distal thematic queries of the type schematically illustrated in FIG. 7. A thematic distal query may take the form of "With what region of polygon 70 intersects the ray A that originates at the origin O and points in the sensed direction?" As shown in FIG. 7, a ray A designating the first direction projects from the origin 71 and intersects polygons 70, 72, 74, and does not intersect a second polygon 70. As the thematic query restricts the outputs to regions or polygons designated 70, there is a unique answer to this thematic distal query based upon the receipt of inputs from the pitch sensor 20 and the yaw sensor 22. The following SQL block represents a thematic distal query, wherein the theme is a "mountain."

```
>    SELECT    mountain.name
>    FROM      mountain
>    WHERE     mountain.geo overlaps traveler.there;.
```

2.3 Query Windows: Local and Distal

Figure 8:
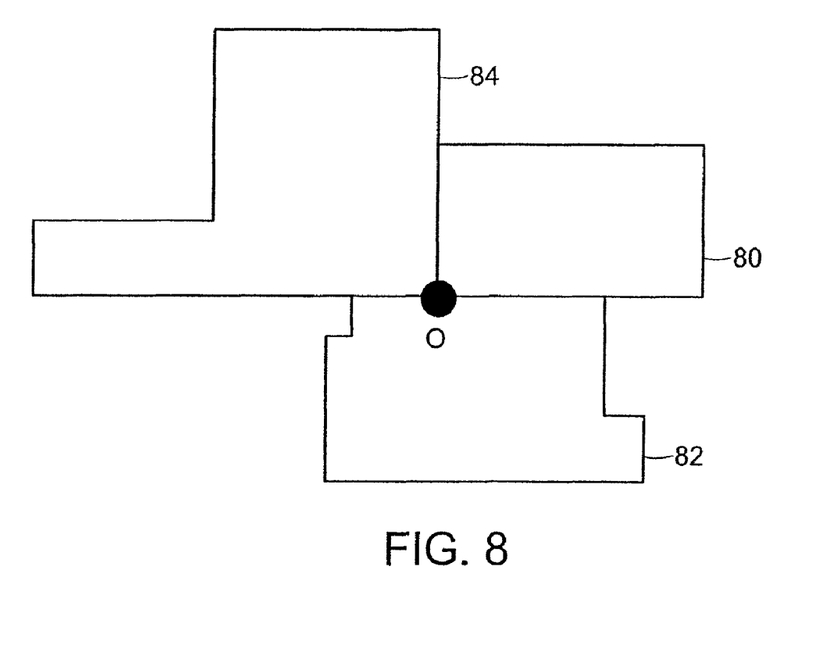
FIG. 8 is a schematic diagram illustrating a local query having partitions.

FIGS. 8-11 are illustrative of the problems that can arise in a world where even thematically restricted queries can return multiple results or no results at all. For example, FIG. 8 depicts an origin O that is not contained within any of the surrounding polygons 82, 84, 86, for example, on the mutual border of a number of states. Thus, the query "In which state am I located?" might not have a simple answer.

Figure 9:
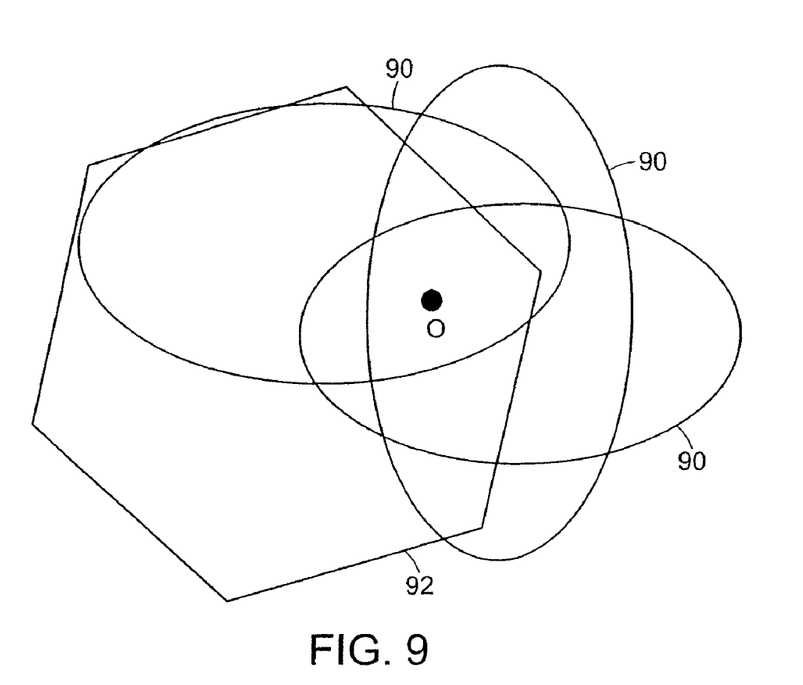
FIG. 9 is a schematic diagram illustrating a local query having overlapping areas of interest.
Figure 10:
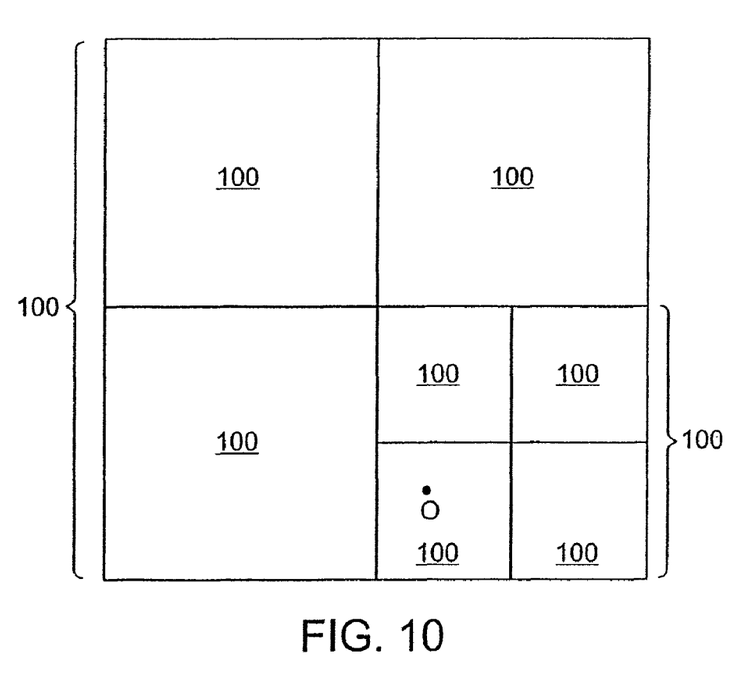
FIG. 10 is a schematic diagram illustrating a local query having hierarchical areas of interest.
Figure 11:
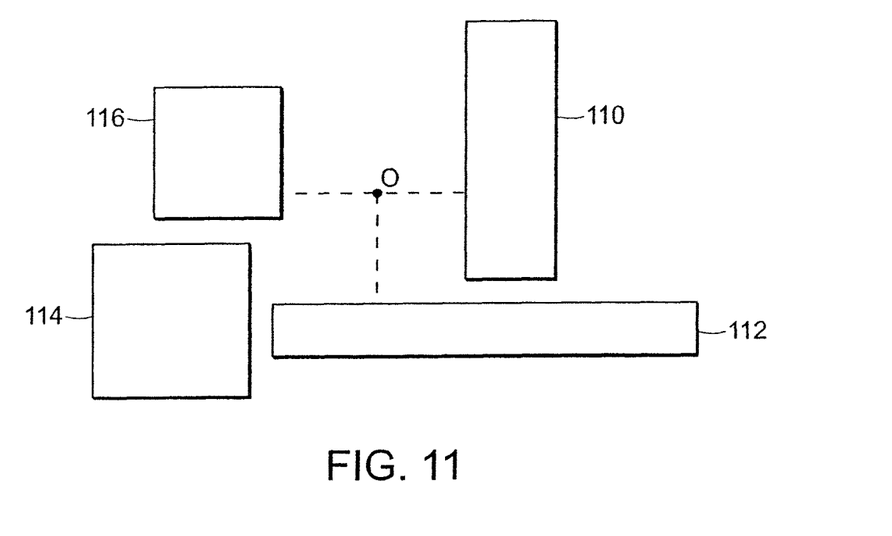
FIG. 11 is a schematic diagram illustrating a local query having disjointed areas of interest.

Likewise, in FIG. 9, the origin O is located within a number of overlapping polygons 90, 92. Each of the polygons designated 90 has a similar theme, and thus cannot be distinguished merely on the basis of a thematic query. FIG. 10 depicts an origin O that is located within a hierarchical series of regions designated 100. Thus, a user can be located within Maine, New England, the United States, and North American at the same time. Lastly, FIG. 11 depicts an origin O that is not located in any polygon 110, 112, 114, 116. As it is possible for there to be non-unique solutions to even thematic queries, the present invention is adapted to select candidates based upon both local and distal query windows based upon the measurement tolerances of the position sensor 18, pitch sensor 20 and the yaw sensor 22.

Figure 12:
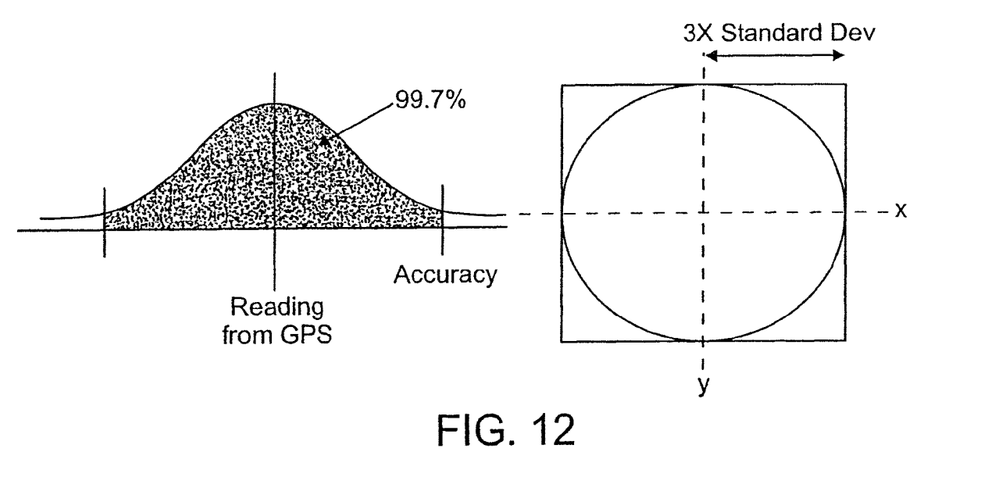
FIG. 12 is a schematic diagram illustrating a local query window in accordance with the present invention.

In order to solve these problems, the controller 10 of the present invention is further adapted to incorporate the influence of the sensors' inaccuracies in order to select an appropriate granularity for the query response. FIG. 12 is a graphical representation of the accuracy of a typical position sensor 18, such as a GPS sensor. For any position sensor 18, accuracy metadata (typically published by the manufacturer based on a series of calibration measurements) is usually expressed as a standard deviation (sd). The Normal Distribution empirical rule in statistics states that 99.7% of all measurements are within a range of three standard deviations, as shown in FIG. 12.

Using the standard deviation data, the controller 10 of the present invention creates a local query window (QWL), with the observed x0-y0-coordinate pair at the center and a side length of six times the sensor's accuracy. The QWL side length is six times larger, because the standard deviation can be thought of as a radius around the point. The QWL is defined in Equation 1 as a minimum-bounding rectangle is placed around this circle.

$$QWL[x0, y0, sd] := \begin{pmatrix} \text{x\_bottom\_left} := x0 - 3 \times sd \\ \text{y\_bottom\_left} := y0 - 3 \times sd \\ \text{x\_top\_right} := x0 + 3 \times sd \\ \text{y\_top\_right} := y0 + 3 \times sd \end{pmatrix} \quad (1)$$

All entities that have something in common with this query window are then candidates for the local query result, whereas entities that are outside the query window are not candidates. The constraint in the SQL WHERE clause for local queries is re-written to:
WHERE QWL {inside, coveredBy, overlaps, equal, contains, covers}*.geometry The controller 10 is further adapted to sort the candidates such that the most reasonable response is returned to the user. This sorting is established based on the degree of overlap (OD) between the query window and the candidate's geometry in the form of a ratio between the common area and the window's area as shown in Equation 2).

$$OD[*.\text{name}] := \frac{(\text{area}(*.\text{geometry}) \cap \text{area}(QW))}{\text{area}(*.\text{geometry})} \quad (2)$$

Depending on the topological relationship between the entity and the query window, different OD ranges will be obtained according to Equations 3 a-f.

QWcontain*.geometry:OD[*.name]>1 (3a)

QWcoveredBy*.geometry:OD[*name]>1 (3b)

QWequal*.geometry:OD[*name]=1 (3c)

QWinside*.geometry:0<OD[*name]<1 (3d)

QWcovers*.geometry:0<OD[*name]<1 (3e)

QWoverlaps*.geometry:0<OD[*name]<1 (3f)

The degree of overlap OD is now a measure for best fit, with 1 being the ideal value and zero representing no entities that meet the requirements of the local query.

The controller 10 is further adapted to employ at least two strategies to identify the best candidate as well as a list of candidates sorted in decreasing order. First, the controller 10 can sort the candidates by the deviation of the overlap degree (ODD) from the target value as defined in Equation 4.

$$ODD[*.\text{name}] := \text{abs}(OD[*.\text{name}] - 1) \quad (4)$$

Since the two ranges of OD values (0<OD<1 and OD>1) differ and since it is likely that very large objects exist that contain the query window, this measure favors candidates in the query window, while penalizing large candidate objects. This strategy for selecting is preferred when a thematic query is utilized for narrowing the range and size of potential candidates, i.e. when the theme selected is building or bridge.

The controller 10 is preferably adapted to normalize the two OD ranges by the smallest (ODmin) and largest (ODmax) values and calculate the deviation of the normalized overlap degree (ODND) from the target value as shown in Equations 5a and 5b.

if OD[*.name]>1 then ODND[*.name]:=abs(1−OD [*.name]/OD min) (5a)

if OD[*.name]<1 then ODND[*.name]:=abs(1+OD [*.name]/OD min) (5b)

The best candidate is then the object with the smallest ODD or ODND value. Subsequent selections of the next-best response can be made from both lists (e.g., when the user is interested in additional responses). While the ODD list offers browsing at coarser or more detailed granularities, the ODND list offers integrated navigation (i.e., "next best").

For example, if a GPS has a standard deviation of five meters, then the QW area will be 900 m². Imagine for reasons of simplicity that the Town of Orono has an area of 90,000 m² and the State of Maine has an area of 900,000 m² and that the QW is completely contained in both. Then the degrees of overlap are:

Town of Orono 900/90,000=0.01

State of Maine 900/900,000=0.001

Sorting these candidates by the deviation of the overlap degree ODD from the target value gives the State of Maine a value of 0.099 and the Town of Orono 0.999. A normalization of these candidates based on equations 5a and 5b shows that the Town of Orono is the "best fit." The reason we are interested in the region that is closest in size to local query window is because it is most likely that the user is interested in the spatial object that is at the granularity level that can be accurately discerned.

As previously discussed, thematic local queries are conducted when the user specifies the thematic classification of interest, such as buildings or roads, which results in queries like, "What building am I in?" When the controller 10 processes a thematic local query, it uses the same processes set forth above in Equations 1-5, except that with the thematic classification of interest known the system is aware of the granularity level in which the user is interested. Unlike in a generic local query, once a sorted descending list of best-fit regions is created for the thematic local query, the candidates are tested to determine whether they are of the selected theme. That is, the QWL is tested to see if it has something in common with a building region. In a thematic local query, the SQL WHERE clause is re-written as:

WHERE QWL{inside, coveredBy, overlaps, equal, contains, covers} building.geometry.

In the case of thematic local queries, the controller 10 is adapted to search the database 16 for candidates having a "building.geometry" instead of the generic term "geometry."

As previously noted, distal queries are based on a position sensor's 18 observed position, as well as the observed angles of the pitch sensor 20 and the yaw sensor 22. As with local queries, the controller 10 is adapted to create a distal query window QWD. In distal queries, a user is interested in an area away from their current location in a direction they select, the first direction. The pitch sensor 20 and yaw sensor 22 determine the first direction, which has a standard deviation specified by the manufacturer of the respective sensors. Based on the local QWL and the first direction, plus the standard deviation of the pitch sensor 20 and the yaw sensor 22, a distal QWD is created by the controller.

Figure 13:
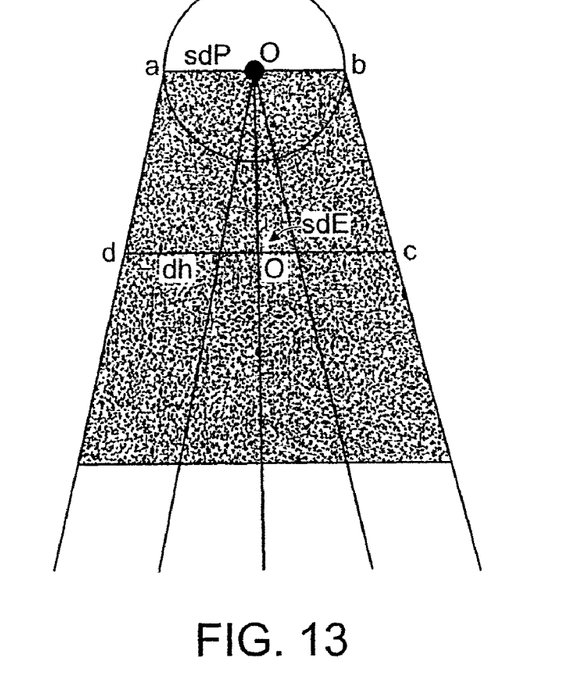
FIG. 13 is a schematic diagram illustrating a two dimensional distal query window in accordance with the present invention.

Referring to FIG. 13, the distal QWD is shown as a combination of the user's position O and positional standard deviation (sdP), as well as the first direction of interest and orientational standard deviation (sdO) derived from the standard deviations of the pitch sensor 20 and the yaw sensor 22. The distal QWD is essentially an error propagation area 130. The controller 10 is adapted to subdivide the distal QWD into smaller polygons based on predefined distances from the user. For example, the area defined by the polygon abcd could be within the first 50 meters from the user.

The controller 10 is adapted to calculate the area of the abcd polygon, as shown below in Equations 6-11.

$$QW[sdP, sdO, x0, y0, yaw0] := \begin{pmatrix} a(x1, y1) \\ b(x2, y2) \\ c(x3, y3) \\ d(x4, y4) \end{pmatrix} \quad (6)$$

Equations 7a and 7b calculate the coordinates of points a and b with input x0 and y0, which are the coordinates of the user's position O as determined by the position sensor 18. The standard deviation of the sensed position, sdP is given by the sensor device manufactures as discussed above. In a preferred embodiment, the yaw angle is the angle from magnetic north clockwise to the first direction.

$$a[sdP, x0, y0, yaw0] := \begin{pmatrix} x1 = x0 - (sdP \times \sin(yaw - 90)); \\ y1 = y0 - (sdP \times \cos(yaw - 90)) \end{pmatrix} \quad (7a)$$

$$b[sdP, x0, y0, yaw0] := \begin{pmatrix} x2 = x0 + (sdP \times \sin(yaw - 90)); \\ y2 = y0 + (sdP \times \cos(yaw - 90)) \end{pmatrix} \quad (7b)$$

The point O' is on segment dc, which is a distance dist away from the user's position O. The coordinates x' and y' are then used to calculate the coordinates for the QWD corners c and d.

$$O'[x0, y0, dist, yaw] := \begin{pmatrix} x' = x0 + (dist \times \sin(yaw)); \\ y' = y0 + (dist \times \cos(yaw)) \end{pmatrix} \quad (8)$$

Once the coordinates for the point O' are found, the controller 10 is adapted to calculate the distance from O' to the corners c and d of the QWD polygon. This distance dh is calculated in Equation 9.

$$dh[dist, sdP, sdO] := sdP + dist \times \tan(sdO) \quad (9)$$

Equations 10a and 10b calculate the coordinates for the corner points c and d. This is done with the coordinates of O' and the distance dh from this point to the QWD corners c and d.

$$c[x', y', dh, yaw] := \begin{pmatrix} x3 = x' + (dh \times \sin(yaw - 90)); \\ y3 = y' + (dh \times \cos(yaw - 90)) \end{pmatrix} \quad (10a)$$

$$d[x', y', dh, yaw] := \begin{pmatrix} x4 = x' - (dh \times \sin(yaw - 90)); \\ y4 = y' - (dh \times \cos(yaw - 90)) \end{pmatrix} \quad (10b)$$

After the development of the distal QWD, the controller 10 is adapted to follow the nominal query protocol described in detail above. All entities that have a part of their area in common with this query window are then candidates for the query result; entities that are outside the query window are not candidates. The constraint in the SQL WHERE clause is re-written.

WHERE QWD {inside, coveredBy, overlaps, equal, contains, covers)*.geometry

Thematic distal queries function with many of the same algorithms as distal queries, except that for thematic distal queries the theme of interest is known, which allows the information system to decide on the granularity level the user should be provided with as a result. In order for the theme type to be known it had to be selected by the user. In one embodiment, a thematic distal object selection operation can be structured similar to the way queries are structured for non-egocentric window queries. By windowing a theme, one obtains another theme that includes only those objects of the input theme that overlap a given area or window. WINDOWING (g, r) is the Boolean operation that consists of testing whether a geometric object g intersects a rectangle r.

Testing whether one vertex of g is within the rectangle is insufficient for purposes of the present invention, as a rectangle may intersect a polygon or a polyline without containing any endpoint. Therefore, the controller 10 of the present invention is adapted to scan the edges of the polygon boundary of object g and test whether an edge intersects one of the rectangle edges, defined by rectangle abcd shown in FIG. 13. Thus, the controller 10 performs two inclusion tests because the geometric object g might be entirely covered by (or might entirely contain) rectangle r.

In another embodiment of the present invention, the user and the sensors of the mobile device 100 provide a perspective view such that the viewing window is a two-dimensional polygon for two-dimensional map information as opposed to a rectangle. A first end of this polygon is the user's current position plus the positional standard deviation, depicted as a circle about the origin O in FIG. 13.

Figure 14:
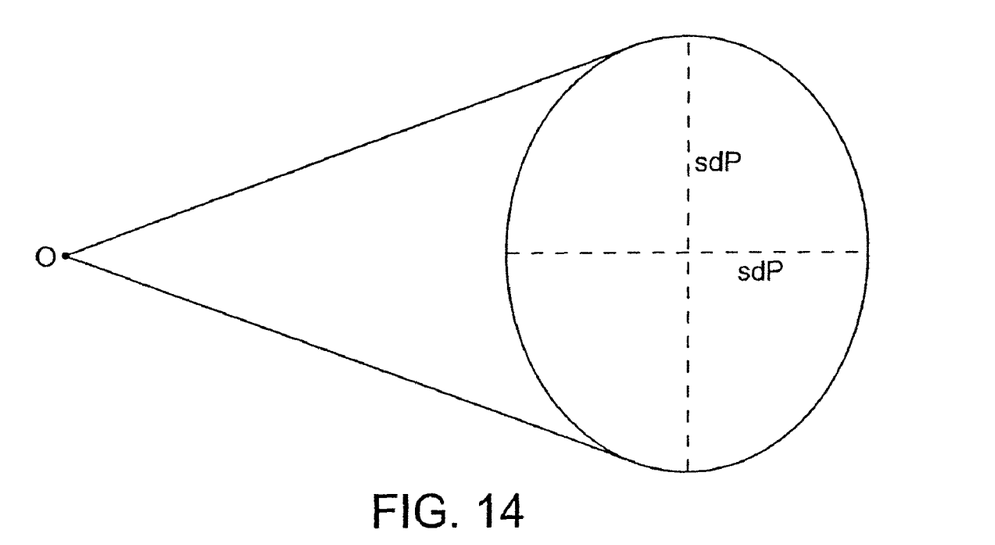
FIG. 14 is a schematic diagram illustrating a three dimensional distal query window in accordance with the present invention.

The controller 10 is further adapted to provide a cone window query in three dimensions. In this case, as shown in FIG. 14, the query polygon is a cone where the vertex is the user's current position defined by the origin O, plus a query window for the position sensor 18. The radius of the cone's cross-section is the accuracy propagation of the pitch sensor 20 and the yaw sensor 22, denoted sdP and sdY, respectively.

For thematic distal queries the query window QWD is created in the same way as for distal queries as noted above. Preferably, the controller 10 is adapted to employ the cone window query as well. As in the thematic local query, once a sorted descending list of best-fit regions is created, the QWD is tested to see if it has something in common with a theme. In the case of a "building geometry" theme, an SQL WHERE clause may be re-written as:

WHERE QWD{inside, coveredBy, overlaps, equal, contains, covers} building.geometry As before, this thematic distal query WHERE clause is different from that for the distal query because in present case, the restrictive theme "building.geometry" is used instead of *.geometry. The *.geometry checks for all geometries that have something in common with the QWD whereas the building.geometry only checks for building geometries.

3. Mobile Device Configured by a Headset and GPS Enabled Device

Figure 15:
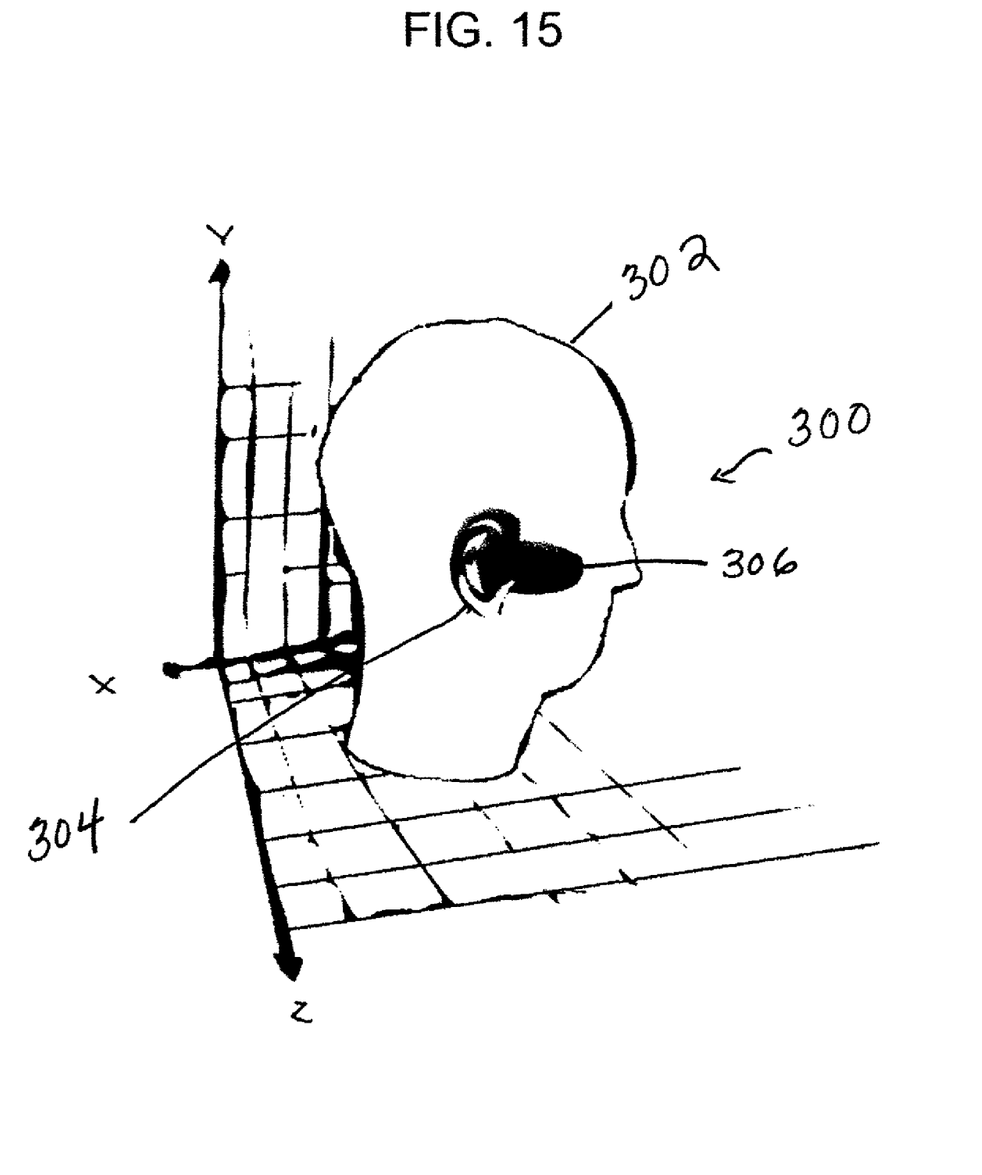
FIG. 15 shows a representative view of a system user with the headset of the present invention disposed over the ear.

Referring to FIG. 15, the embodiment of the present invention will be described in which the mobile device is configured as a combination of a headset with a digital compass connected wirelessly to a GPS device, such as a GPS enabled cell phone. The headset may be worn around a system user's ear. The elements and functions of the headset may also be embodied in jewelry such as a ring, bracelet, or wrist watch as long as it can include a digital compass.

As stated, the digital compass of the headset includes an integrated tilt compensated digital compass, which may also include a tri-axis accelerometer and tri-axis magnetic sensor to provide support for sensing compass headings in six degrees of freedom. The embodiment of the digital compass enabled headset that is wirelessly connected to the GPS enabled device, preferably by a Bluetooth wireless connection, which is disposed on the system user's ear, is shown in FIG. 15.

Referring to FIG. 15, the representation of the system user's head and ear are shown at 302 and 304, respectively. Headset 306 is shown disposed on the ear 304. Head 302, ear 304, and the headset 306 are shown with reference to a X, Y, Z coordinate reference grid. Headset 306 may include a speaker that fits into/around the system user's ear as well as a microphone that is positioned to collect audible statements or sounds from the system user. Headset 306 may also include a wireless transceiver, such as a Bluetooth enabled transceiver, to connect to other devices, including, but not limited to, the GPS enabled cellular phone.

With the headset and a GPS enabled cellular phone, system users are able to learn about objects of interest by simply turning their head to face these objects and pressing a button on the headset or remote unit that is connected to the headset in either a wired or wireless manner. The digital compass information from the headset, which includes but is not limited to pointing direction, and elevation or depression of the headset, are then sent to the system users' cellular phones and combined with their coordinates from the cellular phones with an integrated GPS. The GPS coordinates and digital compass information are sent over the cellular phone's data network to a processing system, such as the iPointer™ mobile search and content delivery platform or functionally similar system. Search results are streamed back to the system users' cellular phones and the system users hear descriptions of the objects of interest via their headsets.

A variant of the headset described above includes stereo headphones that provide a speaker for both ears. In this stereo version, one ear unit may have a digital compass as well as a speaker and/or microphone and the other ear component may have a GPS receiver plus a speaker and/or microphone.

If system users employ the stereo version of the headset as described, typically there will be no need for a GPS enabled cellular phone as part of the system but any standard Bluetooth enabled cellular phone may be substituted. The stereo version of the user headset places an ear unit over both ears containing a speaker. One ear unit will have the GPS feature, while the other ear unit will have the tilt compensated digital compass feature. Given this, all system users have to do are turn their heads, press a button, and the GPS coordinates and digital information compass are sent via Bluetooth to the system users' cellular phones. The coordinates and digital compass information are then sent over the cellular phone's data network to a mobile search and content delivery platform, such as iPointer™.

The jewelry variation of the present invention is worn like a ring, bracelet, or wrist watch but also includes a tilt compensated digital compass and a Bluetooth transceiver. The system user points with the hand that has the ring, bracelet or wrist watch, and then taps a button on his/her cellular phone, which takes the digital compass information from the tilt compensated digital compass enabled jewelry and combines it with the coordinates from the GPS enabled cellular phone. The GPS coordinates and digital information compass are sent over the cellular phone's data network to a processing system, such as the iPointer™ mobile search and content delivery platform or functionally similar system. Search results are streamed back to the system users' cellular phones and the system users hear descriptions of the objects of interest via their headsets.

4. Summary

The present invention thus provides a system and mobile device for providing geographic information to a user. The system includes a mobile device that is wirelessly connected to a geographic database. The mobile device as a single defined device or a combination of devices that constitute the mobile device includes a plurality of sensors for determining a first location and a first direction. A controller is part of the mobile device, and it is adapted to provide information requested based on local queries and distal queries. In addition, the controller can respond to thematic queries of each variety, wherein the database search is limited to objects, entities or features that fit within a selected theme. Finally, the controller is adapted to select and order query results based upon the novel process of creating two and three dimensional query windows and weighting query results based upon predetermined relationships to the query windows.

It should be apparent to those skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

We claim:

1. A system for providing geographic information comprising:
   a database containing geographic information, the database accessible via a network connection; and
   a mobile device including a headset and Global Positioning System (GPS) enabled device connectable to the database from a remote location, the GPS enabled device including at least a controller and a position sensor for determining a location of the mobile device and the headset including at least a digital compass being adapted to orient the mobile device pointing in a direction to intersect a particular one of an object, geographical feature or location of interest to a user, the controller of the GPS enabled device being adapted to receive a thematic query from a user, the controller being further adapted to retrieve a portion of the geographic information from the database selected by a combination of the location of the mobile device, a pointing direction of the mobile device and the thematic query, and the geographical information is about the particular object, geographical feature or location.

2. The system of claim 1, where the system further comprises a wireless router for connecting the mobile device to the database.

3. The system of claim 1, wherein the headset includes a pitch sensor for determining a first angle usable by the controller to compute the pointing direction, and a yaw sensor for determining a second angle usable by the controller to compute the pointing direction.

4. The system of claim 1, wherein the system further includes a display connected to the GPS enabled device for presenting information of interest to a user.

5. The mobile device of claim 1, wherein the thematic query includes a predetermined set of object classes from which the system may select in determining a response to a thematic query.

\* \* \* \* \*